Nov. 16, 1954

A. MULLER 2,694,763

ELECTRIC ARC WELDING

Filed May 17, 1952

INVENTOR
ALBERT MULLER
BY
H. Hume Mathews
ATTORNEY

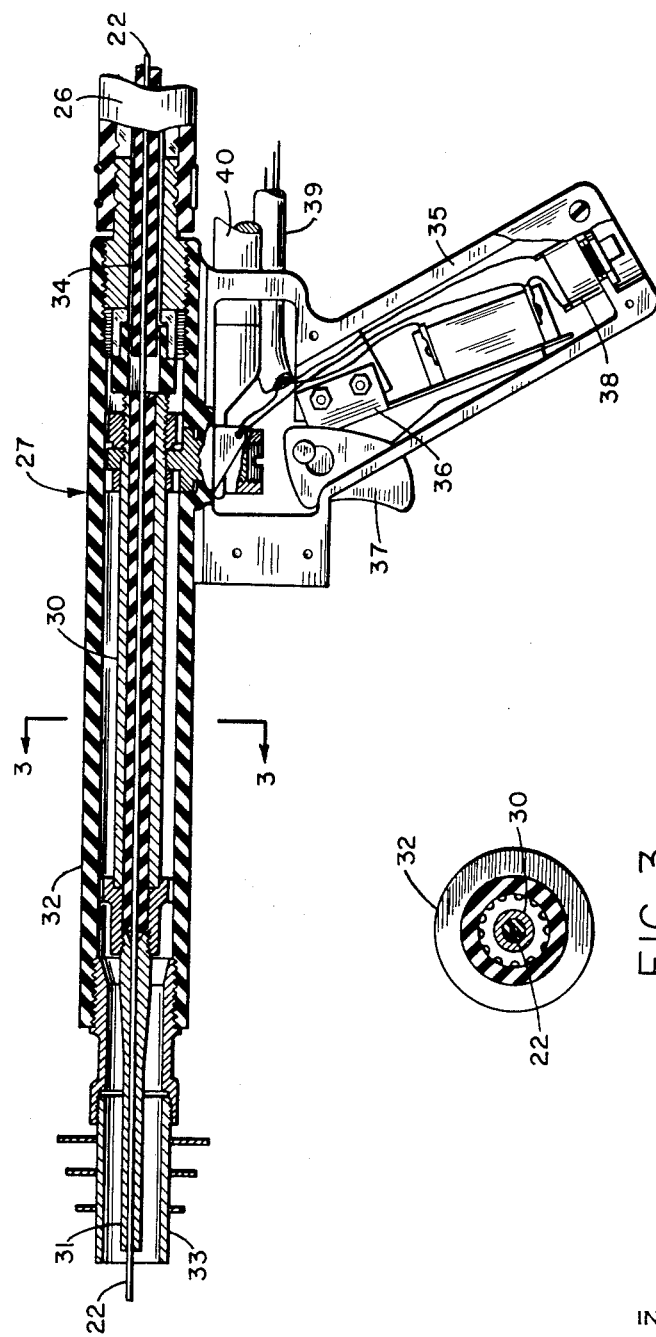

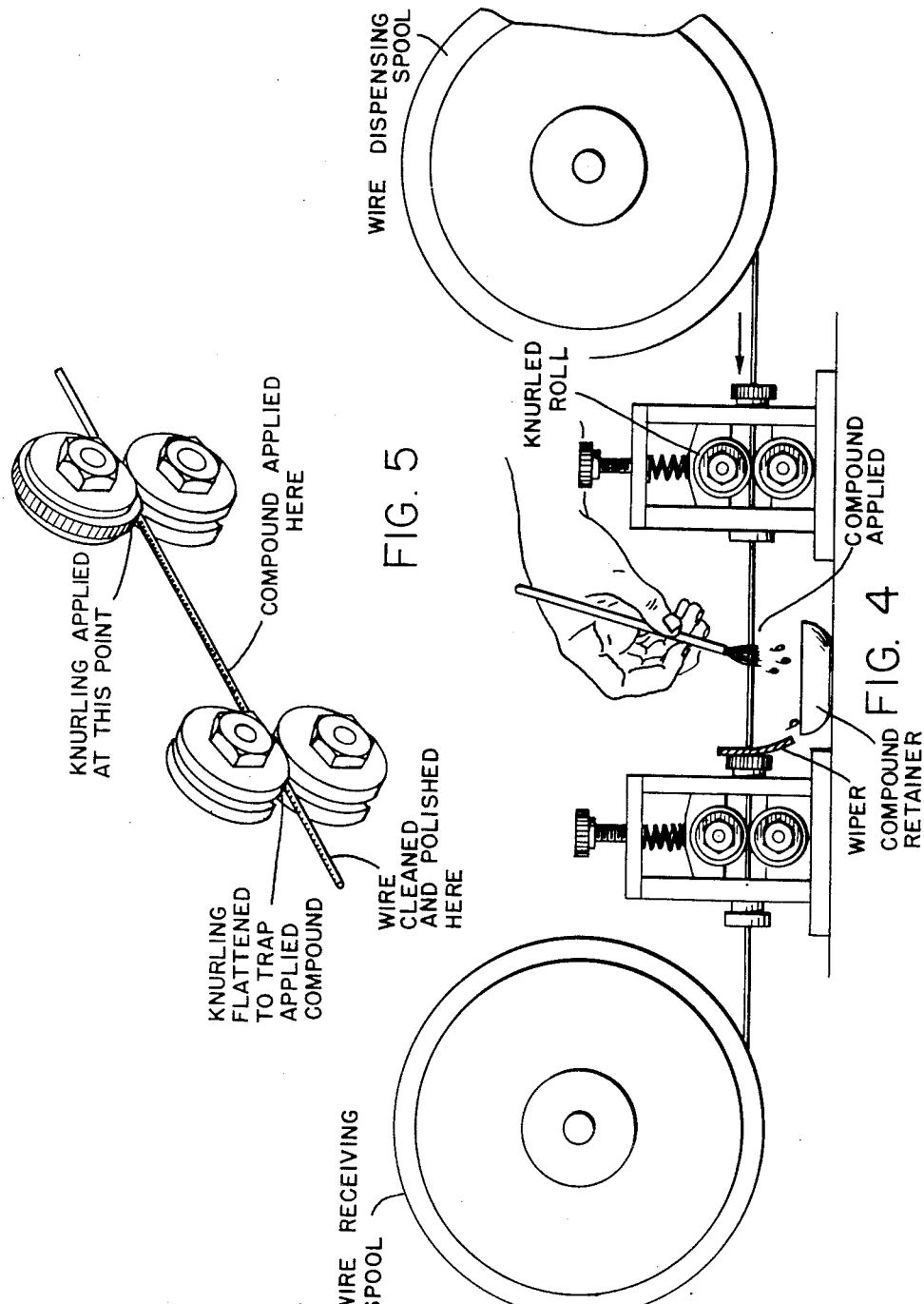

Nov. 16, 1954
A. MULLER
2,694,763
ELECTRIC ARC WELDING
Filed May 17, 1952
13 Sheets-Sheet 4
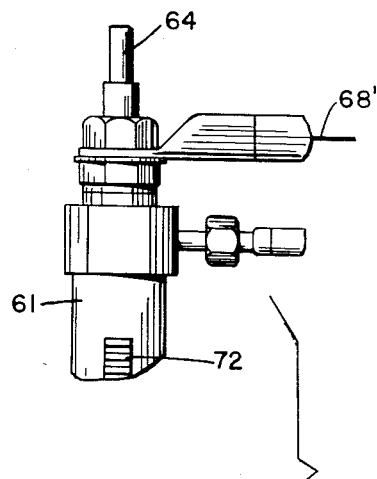
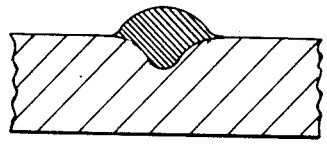
FIG. 6
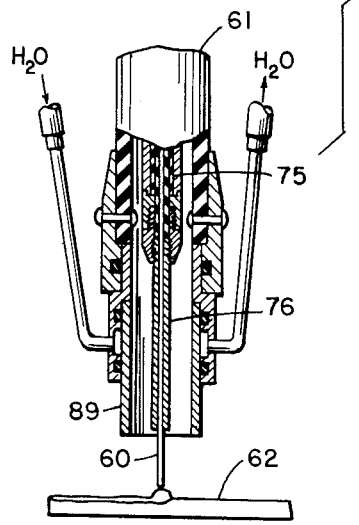
FIG. 15
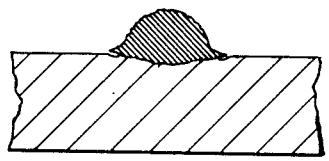
FIG. 7
INVENTOR
ALBERT MULLER
BY
ATTORNEY Nov. 16, 1954

A. MULLER 2,694,763

ELECTRIC ARC WELDING

Filed May 17, 1952

INVENTOR
ALBERT MULLER
BY
ATTORNEY

Nov. 16, 1954     A. MULLER     2,694,763
ELECTRIC ARC WELDING
Filed May 17, 1952     13 Sheets-Sheet 11
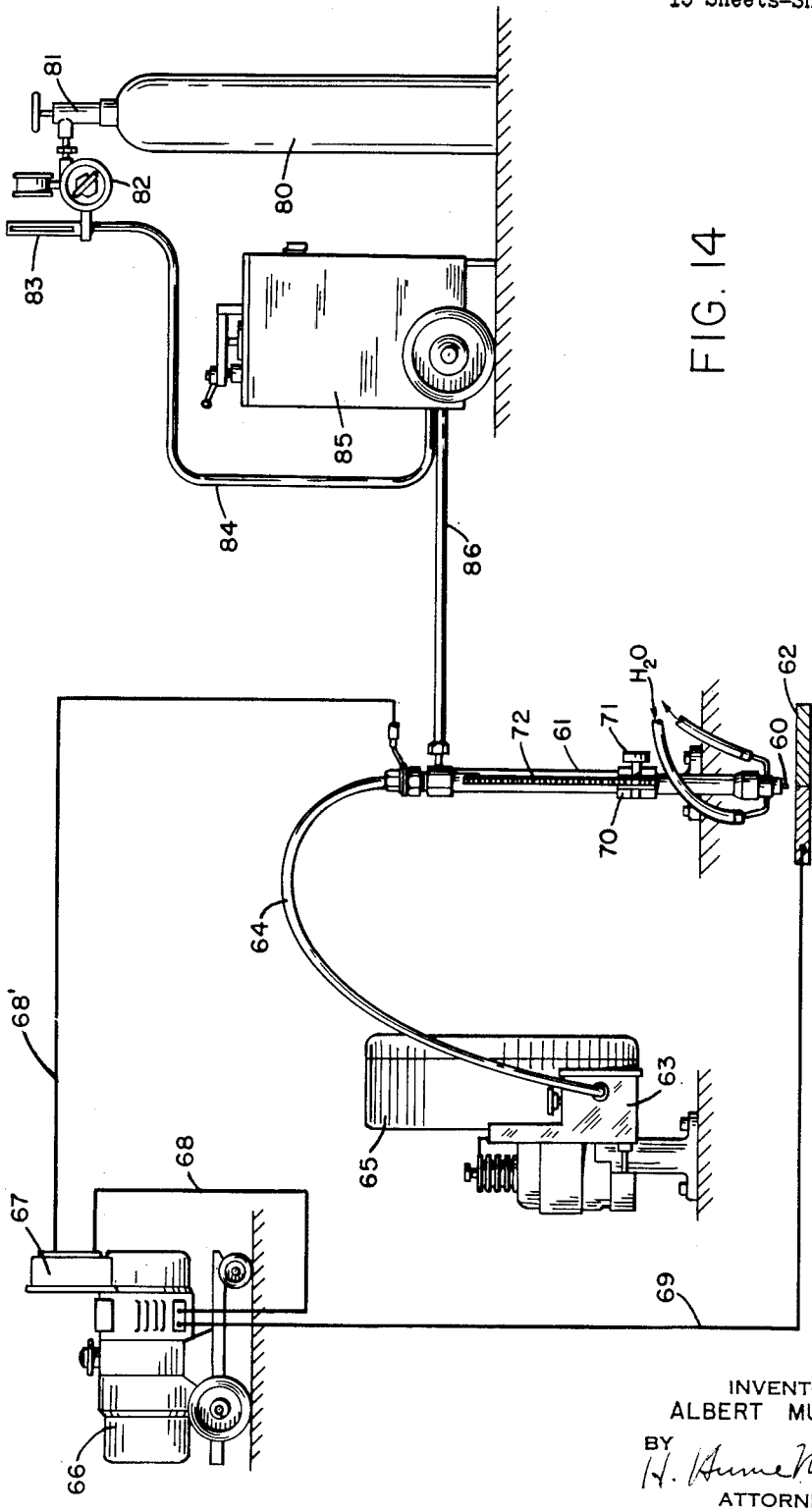
INVENTOR
ALBERT MULLER
BY
ATTORNEY Nov. 16, 1954    A. MULLER    2,694,763
ELECTRIC ARC WELDING
Filed May 17, 1952    13 Sheets-Sheet 12

INVENTOR
ALBERT MULLER
BY
ATTORNEY

United States Patent Office 2,694,763
Patented Nov. 16, 1954

2,694,763

ELECTRIC ARC WELDING

Albert Muller, Plainfield, N. J., assignor to Air Reduction Company, Incorporated, New York, N. Y., a corporation of New York Application May 17, 1952, Serial No. 288,447

20 Claims. (Cl. 219—10)

This invention relates to gas shielded electric arc welding methods and apparatus and more particularly to methods and apparatus for inert gas shielded arc welding with a consumable or depositing electrode, referred to herein as inert gas shielded metal arc welding.

The present application is in some respects a division and in other respects a continuation-in-part of my copending application Serial No. 204,726 filed January 6, 1951, which in turn is a continuation-in-part of my prior application Serial No. 76,443 filed February 15, 1949, now abandoned. The inventive subject matter hereof can be considered in at least certain aspects to constitute a new and useful improvement in gas shielded metal arc welding methods and apparatus of the type disclosed in Muller et al. Patent No. 2,504,868, issued April 18, 1950; Mikhalapov Patent No. 2,544,711, issued March 13, 1951; and Muller et al. Patent No. 2,544,801, issued March 13, 1951; all assigned to the assignee of the present application.

In general, the new method of this application involves the addition to an inert gas shielded consumable electrode welding arc of a substance or substances which act to alter, in a desired predetermined manner and to a desired predetermined extent, the heat balance between the welding electrodes, i. e., the quantity of heat released or produced at the cathode during the welding operation relative to the heat released or produced at the anode during the welding operation. Thus the heat balance of the inert gas shielded metal arc welding process can be controlled. Further and/or other features of the new method hereof involve the addition to such a welding arc of a substance or substances which act to improve the characteristics of the metal transfer from the consumable electrode to the workpiece; to improve the stability of the arc, and to control or alter in a desired manner those factors of the welding arc which determine the speed, efficiency and facility of the welding operation and the characteristics of the resulting weld.

The new apparatus of this application involves, in general, new articles and elements and new combinations thereof particularly designed to carry out the new methods referred to above.

Patents Nos. 2,504,868; 2,544,711; and 2,544,801 referred to above, disclose a welding operation of the type in which a consumable electrode wire is fed continuously to a gas shielded welding arc maintained between the electrode and a workpiece (plate), the welding current supplied to the arc being at least sufficient to consume the electrode as it is fed to the arc and transfer weld metal from the electrode to a weld deposit on the workpiece to form a commercially satisfactory weld, the current preferably being also supplied at a high current density sufficient to provide a smooth, fast and uniform deposit or "spray type" transfer (see Patent No. 2,504,-868) of weld electrode metal to the weld deposit. The shielding gas consists essentially of an inert gas. Inert shielding gas as used herein refers to the monatomic gases or mixtures thereof such as helium and/or argon and may include minor proportions of other gases that do not substantially alter the shielding characteristics of said monatomic inert gas or gases, preferably supplied as a substantially non-turbulent or laminar flow stream of sufficient "flow stiffness" to exclude substantially all the ambient atmosphere from the arc. Such an arc involves an electrical discharge through a controlled gas atmosphere. The gas in the arc gap is ionized and the resulting positive gas ions are impelled by the potential gradient toward the cathode where they yield their energy to the cathode or are neutralized by electrons emitted from the cathode. Metal vapor formed in the arc region by vaporization of the electrode, the plate (workpiece) or any other source such as a separate filler wire, forms part of the gas in the arc gap, so that the arc atmosphere through which the electrical discharge takes place and through which the weld metal transfers from the wire electrode to the plate comprises the inert shielding gas and said metal vapor, substantially all air, water vapor and other constituents of the ambient atmosphere being excluded by the inert gas shield. Since there is no flux, atmospheric air or similar impurity present as would be the case in welding in air, under a flux blanket, or with coated electrodes, the characteristics of such an arc, at a constant pressure, depend solely upon the characteristics of the plate and electrode metals and of the inert shielding gas.

According to the present invention, it has been discovered that by providing certain addition substances in said arc (in addition to the metal which is melted to form the weld bead and the metal vapors thereof, and in addition to the inert shielding gas) the heat balance and/or certain other characteristics of the welding arc can be controlled or changed in a desirable manner. These addition substances are so selected and so added to the arc as to lower the work function of the cathode to shift the heat balance (the heat generated or released at the cathode relative to the heat generated or released at the anode) in a predetermined manner and to a predetermined extent, and to provide a stable, concentrated cathode spot. It is believed that where the wire is the cathode concentration of the cathode spot in this manner improves metal transfer so long as the drops or spray of molten metal as it leaves the wire is completely immersed in the plasma. Thus, the addition materials of the present invention may act to stabilize the arc and improve the metal transfer characteristics of the arc (for example, promote the spray type transfer from the wire to the work), also they may alter in a predetermined manner such factors as wire burn off rate, penetration, and size and contour of the weld bead.

It is believed that the heat liberated or generated at the cathode in inert gas shielded metal arc welding is to a large extent the result of the positive ion bombardment thereof. When the cathode is of such nature that it emits electrons thermionically in relatively large quantities at its welding temperature, it is believed that the positive ions are neutralized to a large degree before they reach the cathode, the cathode voltage drop is low, and bombardment of the cathode and generation of heat at the cathode is minimized. When the cathode is a poor thermionic electron emitter at its welding temperature, the positive ion bombardment is heavier, the cathode voltage drop is high, and relatively large quantities of heat are generated at the cathode.

It has been found that when a material which is a good thermionic electron emitter at its welding temperature (i. e., a thermionic material) is used as a welding arc cathode it forms a very efficient cathode with a low cathode voltage drop and a low heat release. This may be attributed to the fact that positive ion bombardment which is thought to produce a major portion of the total heat liberated to the cathode is relatively light, or limited, in the case of thermionic materials; such materials emit at their welding temperature, with a low cathode voltage drop, all the electrons needed by the arc. This limiting effect is not present in the case of the relatively poor thermionic emitters or "cold cathode" materials, in which class fall most of the common structural materials such as aluminum, copper, nickel, iron, magnesium, titanium, etc., and alloys thereof normally welded commercially in large quantities. From a highly simplified viewpoint, if cold cathode material is used as the cathode of the arc it forms an inefficient cathode and as a result, there is in the inert gas shielded welding arc having electrodes of cold cathode material a heavy positive ion bombardment of the cathode and a high heat release at the cathode, as compared with cathodes of thermionic material which are relatively efficient, resulting in a low heat release.

There is little difference in the heat release to the welding arc anode, whether it be composed of a thermionic or a cold cathode material. It has been found that the anode heat release is intermediate between the high heat release to a cold cathode material used as a cathode and a thermionic material used as a cathode.

There is another important difference between the operation of a thermionic cathode as compared to a cold cathode in inert gas shielded metal arc welding. Since the thermionic cathode emits electrons readily and copiously by virtue of its temperature, it continues to emit these electrons even after the current to the arc is extinguished due to the thermal lag in the temperature of the electrode. Since electron emission by cold cathode material does not depend upon thermal effect, the supply of electrons is immediately extinguished when the current is interrupted. It has been found that thermionic materials form more stable inert gas shielded consumable electrode welding arcs. When arc interruptions occur a supply of electrons continues to be given off from the thermionic cathode by virtue of its temperature to produce easy re-ignition of the arc at a low open circuit voltage. The cold cathode material requires a very high open circuit voltage, sufficient to establish a glow discharge, before re-striking the arc after an arc interruption.

The present invention provides for the modification of welding electrode materials, and particularly cold cathode welding electrode materials, in inert gas shielded metal arc welding to produce electrical and thermal arc characteristics that are similar to and/or which approach to a predetermined degree the electrical and thermal arc characteristics of thermionic welding electrode materials, at the temperatures occurring in the inert gas shielded consumable electrode welding arc. The electrical and thermal characteristics of an inert gas shielded metal welding arc between electrodes formed of cold cathode materials are thus controlled, such control being accomplished preferably through the addition of material to the arc which acts to change the heat produced or released at the cathode relative to that produced or released at the anode, i. e., to shift the heat balance of the arc. It has been found that such additions may be made in minute amounts relative to the amount of deposited weld metal, or electrode wire consumed. The material added may be in such small amounts as to affect only the electrical and thermal characteristics of the arc. While it will change beneficially or control the size and shape of the weld bead it can, if desired, be so selected, and used in such small quantities, as to have no substantial or appreciable effect on the chemical composition of the weld metal, or appreciable reaction with the metal being welded.

Welding arcs to which additions are made according to this invention are preferably those having a substantially "sterile" arc atmosphere or environment consisting essentially of inert shielding gas and such metal or like vapor as boils off the electrode, and workpiece. The non-turbulent inert shielding gas stream substantially excludes the ambient atmosphere from such welding arc and, because the welding process is a fluxless one, the electrical and thermal characteristics of such arcs depend solely upon those of the shielding gas and the metal of the electrodes. Fluxless, sterile, consumable bare electrode welding arcs of this character have different electrical and thermal properties than welding arcs in air, welding arcs formed under a submerged flux blanket, or those formed with the conventional flux coated electrodes. It has been found, according to the present invention, that the electrical and thermal characteristics of such inert gas shielded consumable electrode welding arcs can deliberately be varied and controlled to provide new and improved types of welding. The relatively pure, sterile inert gas environment insures that the added control substances will act upon or with, or will modify the arc electrode surfaces and/or the arc atmosphere in the manner and to the extent desired without loss of the beneficial effect of the inert shielding gas and without either loss of control or undesired further modification of electrical and thermal properties that might result from the presence of impurities such as air or fluxes and coatings which are present in conventional welding in air, under a flux blanket, and with coated electrodes.

One of the objects of the invention is to provide a commercially practicable means for shifting the heat balance of the inert gas shielded consumable electrode direct current welding arc to a selected degree. Direct current welding arcs are, of course, of two types, the straight polarity direct current welding arc in which the wire electrode is the arc cathode and the reverse polarity direct current welding arc in which the plate or work is the arc cathode.

Another object is to provide means for improving the metal transfer characteristics and the stability of the inert gas shielded consumable electrode direct current welding arc.

Other objects are to obtain better arc stability in inert gas shielded metal arc welding, particularly where inert shielding gases of relatively poor ionization properties, such as helium, are used; and to provide means for varying or controlling such factors of the inert gas shielded consumable electrode welding arc as weld bead size, shape and penetration, rate of weld metal deposition from the consumable electrode to the plate (burn off rate), amount of plate metal melted per unit of time, size and shape of the weld crater and the weld puddle on the plate, and similar factors having to do with the speed, facility of operation and results of the inert gas shielded metal arc welding process.

Still other objects, results and advantages of the invention will be understood by and apparent to those skilled in the art upon considering the following detailed description and explanation of certain presently preferred embodiments of the invention and from the accompanying drawings in which;

Fig. 2 is a cross-section showing in detail the actual structure of the inert gas shielded metal arc welding manual gun which forms part of the apparatus of Fig. 1.

Fig. 3 is a cross-section on the line 3—3 of Fig. 2.

Fig. 4 illustrates schematically a method and apparatus for making additions to a welding electrode wire for the purpose of the present invention.

Fig. 5 illustrates, on a somewhat enlarged scale, the welding wire as it appears during the various steps of preparation illustrated in Fig. 4.

Fig. 6 illustrates a cross-section of a weld bead made by the present invention.

Fig. 7 illustrates a cross-section of a weld bead comparable in some respects to the weld bead illustrated in Fig. 6 but made without benefit of the present invention.

Fig. 14 illustrates a modified apparatus set-up suitable for the practice of the invention.

Fig. 15 is an enlarged view, partially in section and partially broken away of the machine type welding gun forming part of the apparatus of Fig. 14.

Figure 1:
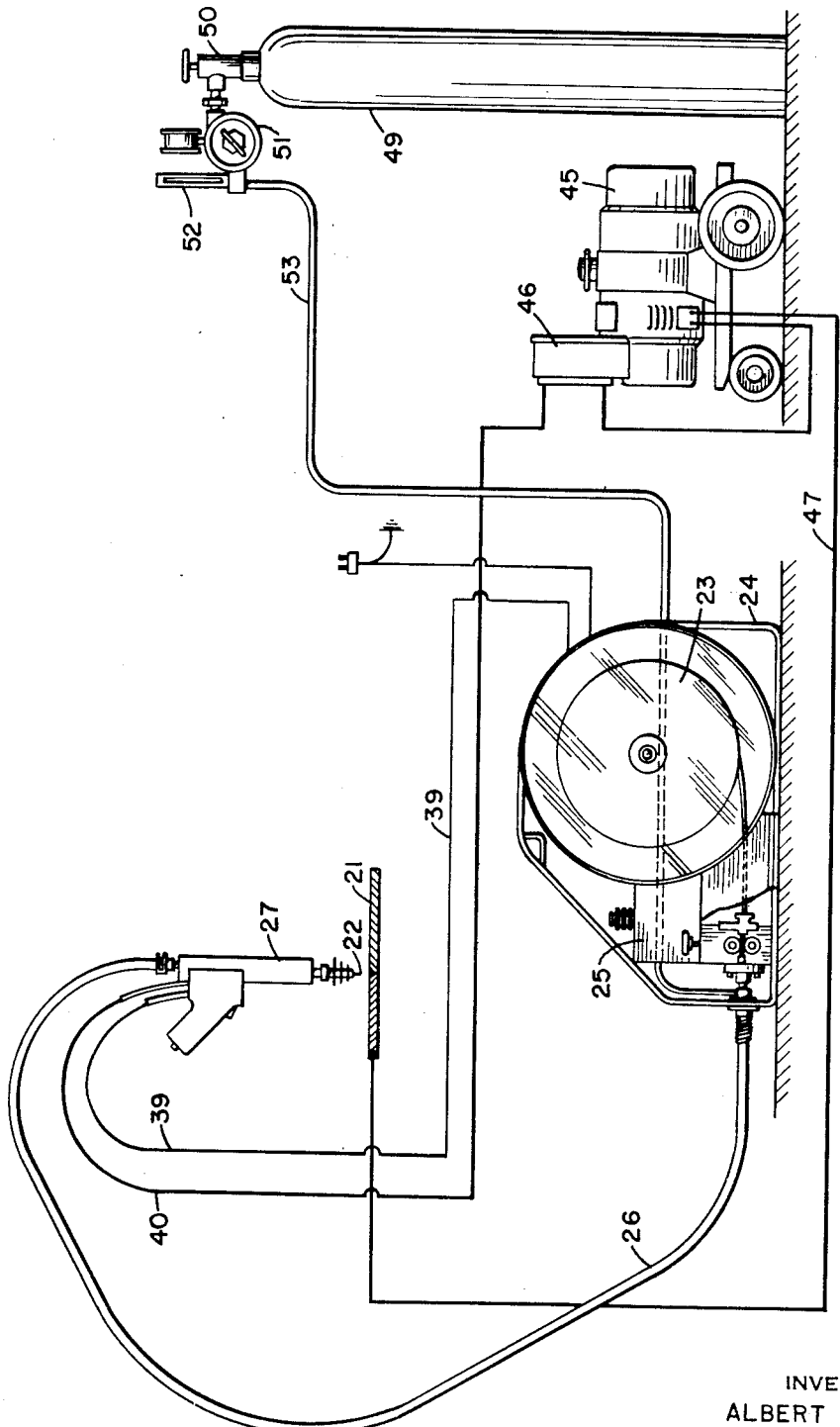
Fig. 1 illustrates diagrammatically an apparatus suitable for the practice of the invention.
Figure 8:
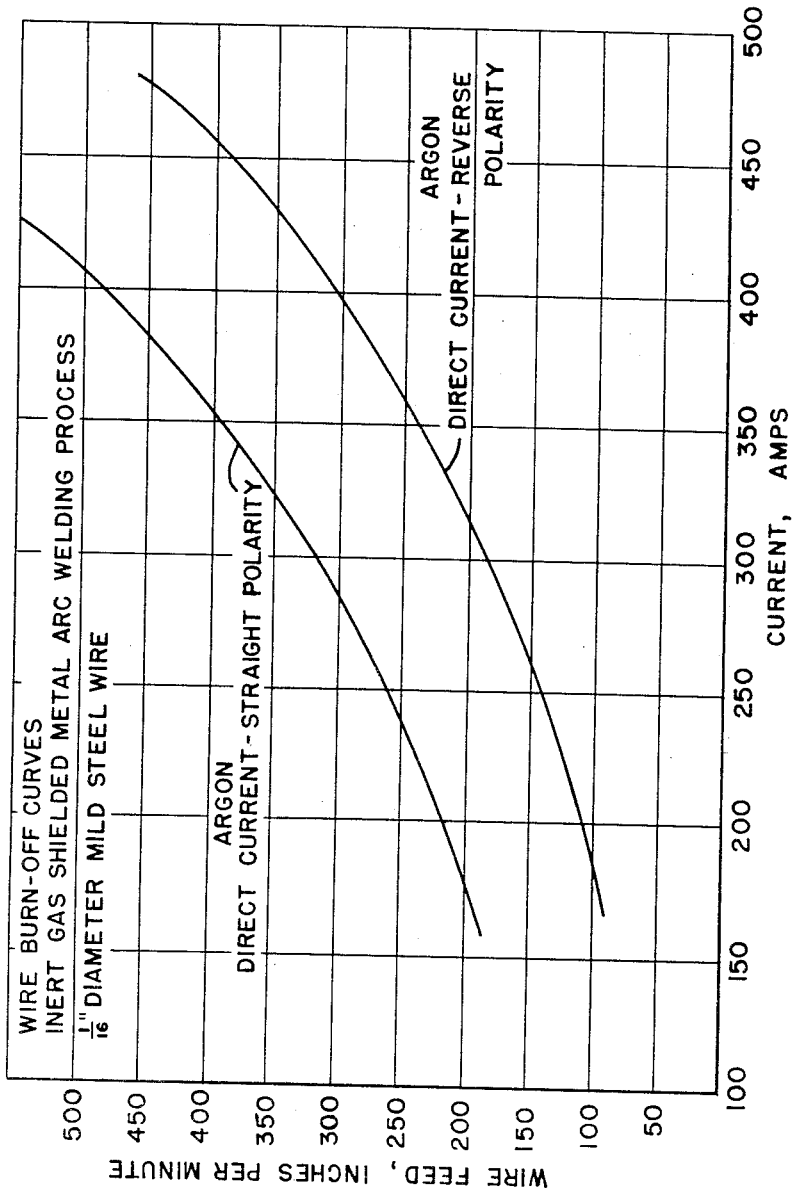
Figs. 8 through 12, show wire burn off rate plotted against welding current for various electrode wires with and without the arc additions of the present invention.
Figure 9:
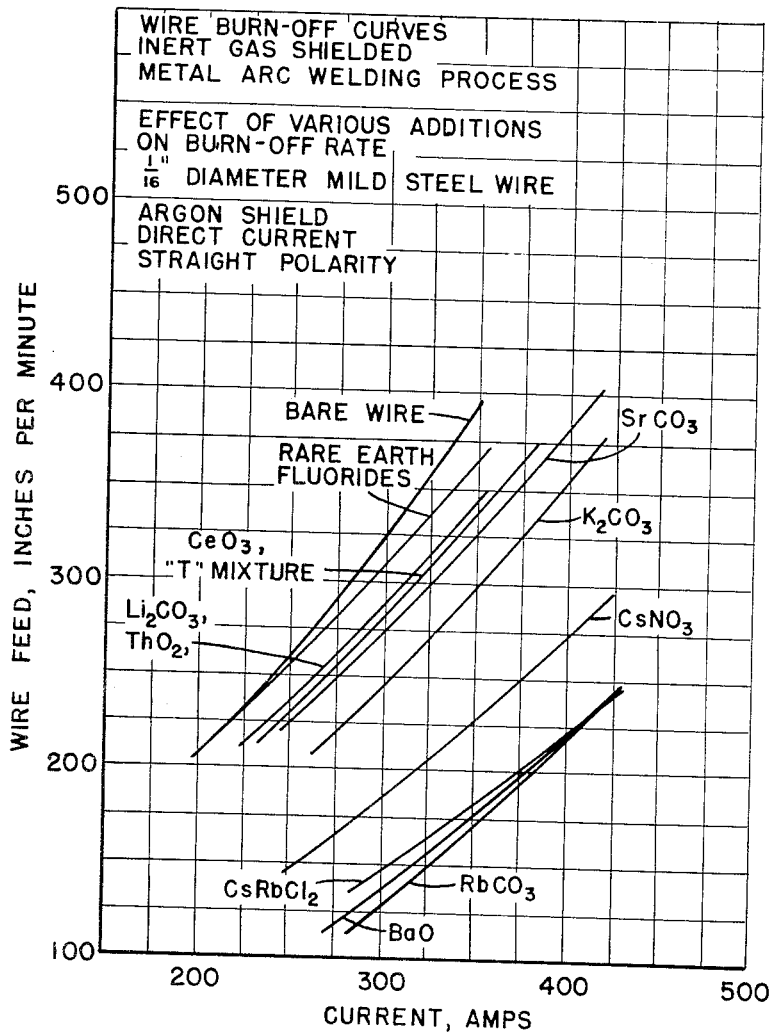
Figure 10:
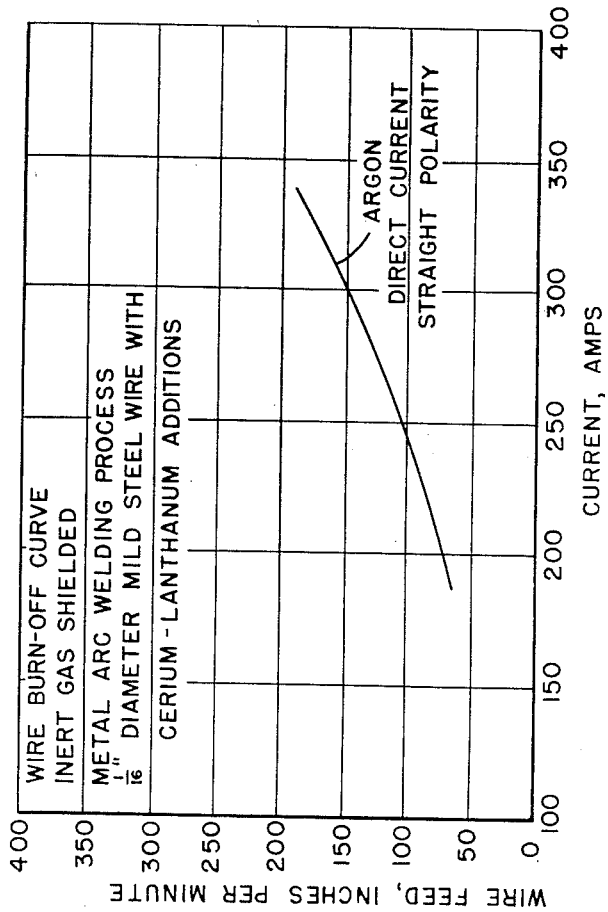
Figure 11:
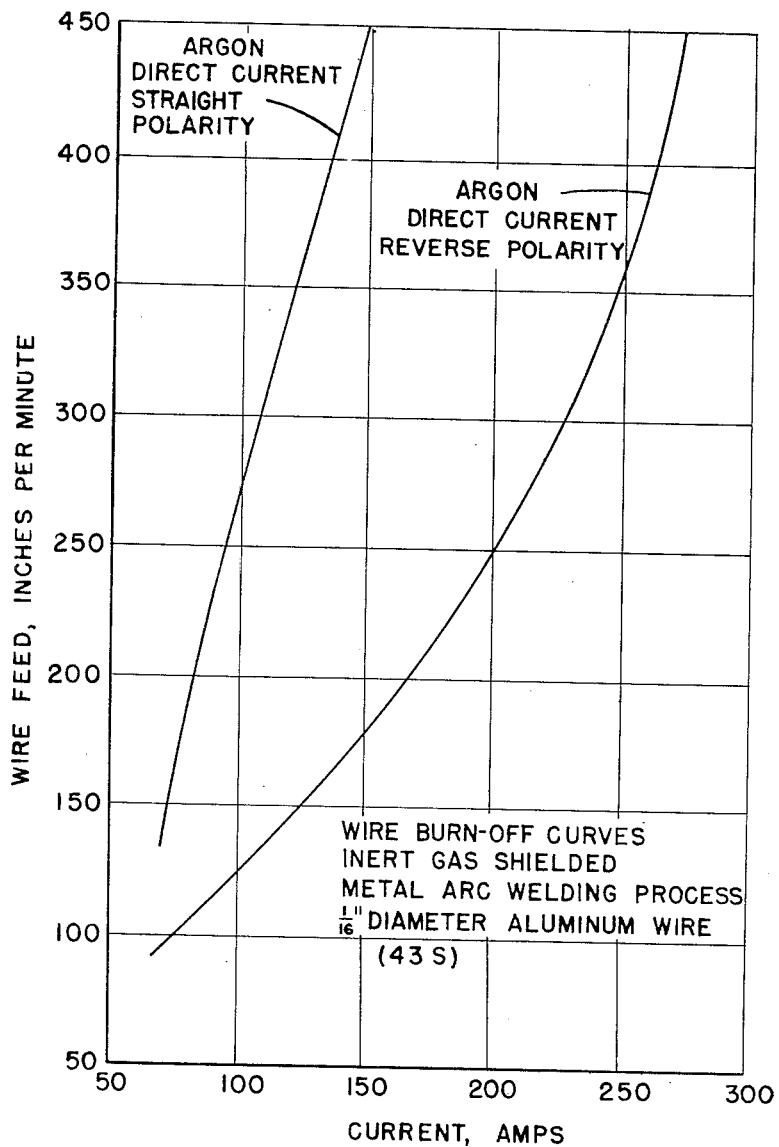
Figure 12:
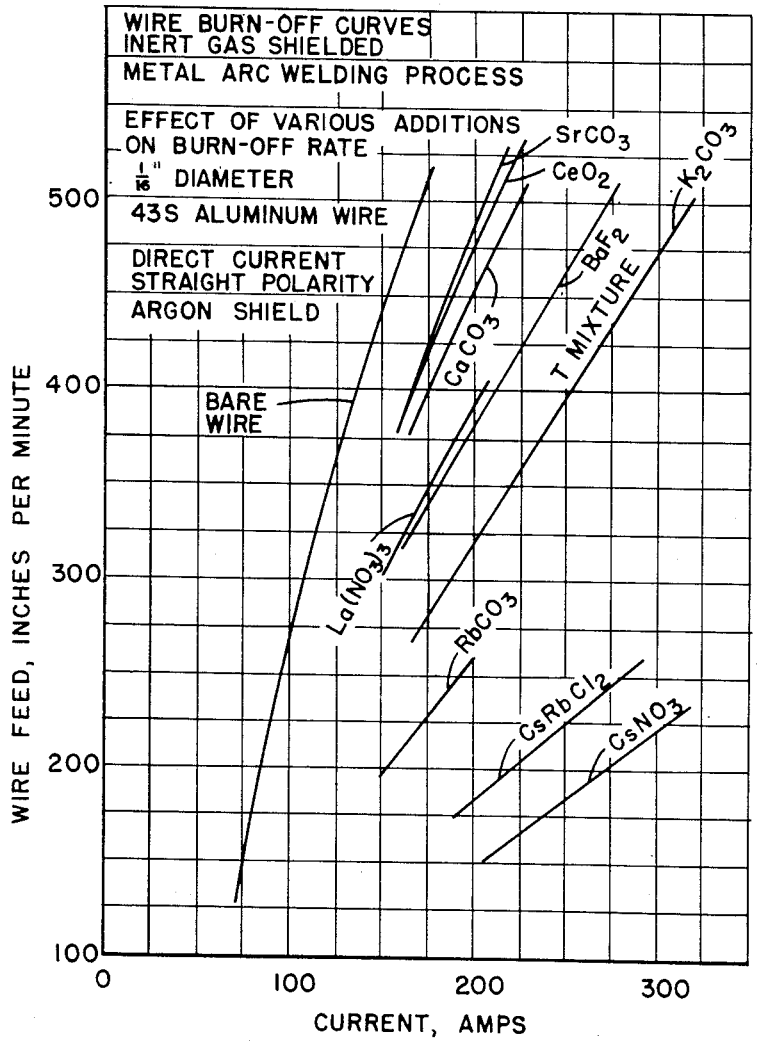

Referring to Fig. 1 the work or plate to be welded is designated 21. The welding electrode 22 is supplied preferably in the form of a long length of wire dispensed from a reel 23 mounted within a frame 24. Motor driven feed mechanism 25 withdraws the wire from the reel and pushes it continuously, at a selected feed rate equal to the electrode burn off rate, through a flexible casing 26 to a welding gun 27. The wire reel and reel support, and the feed mechanism may be of the type disclosed in Anderson application Serial No. 182,488, filed August 31, 1950, now U. S. Patent 2,681,401 granted June 15, 1954. The flexible casing and the welding gun may be of the type disclosed in Anderson application Serial No. 209,430, filed February 5, 1951, now U. S. Patent 2,659,796 granted Nov. 17, 1953. The welding gun and casing are best shown in Figs. 2 and 3. Briefly described, the gun comprises an inner barrel assembly 30 through which the electrode wire 22 is fed. The electrode wire enters the inner barrel 30 from casing 26 and is delivered to contact tube 31 where the welding current is introduced. The wire passes from the contact tube 31 directly to the arc where it is melted or consumed and transfers to and is deposited in the weld puddle or crater on the plate. An outer barrel assembly 32 terminating in a nozzle 33 surrounds the inner barrel assembly and the contact tube. The annular space between the inner and outer barrels and between the contact tube and the nozzle forms a gas passage for the flow of inert shielding gas to the arc region. The gas supply system will be more fully disclosed hereinafter, but shielding gas is delivered by the casing 26 to the gun gas passage 34. The gas emerges from the gas nozzle as a substantially non-turbulent flow stream to shield the end of the electrode, the arc, and the weld puddle. Mikhalapov Patent No. 2,544,711, issued March 13, 1951, and Muller-Gibson Patent No. 2,544,801, issued the same date, disclose in detail preferred ways of forming the substantially non-turbulent gas shield. The remainder of the gun of Fig. 2 comprises a handle portion 35 in the form of a pistol grip. This handle portion contains a control switch 36 actuated by a trigger 37. This switch preferably is connected to give the operator thereof control of the welding current flow, the shielding gas flow, and the wire feed mechanism. The electrical leads to this control switch 36 and an auxiliary wire feed control switch 38 are united in control cable 39. Welding current is conducted to the gun through welding cable 40.

The welding current may be provided by a conventional D. C. welding machine 45. One terminal of the welding machine is electrically connected to the work by conductor 47 and the other terminal is electrically connected by the conductor in cable 40 to the welding gun and contact tube 31 through which the current is transferred to the wire electrode. A contactor 46 is preferably included for opening and closing the welding circuit.

Inert shielding gas is supplied from a high pressure gas cylinder 49 equipped with a cylinder valve 50, a pressure-reducing valve 51, and a flowmeter 52. Conduit 53 carries the gas to the trailer end of casing 26.

In operation, the shielding gas flow is preferably established prior to striking the arc. The welding machine may be actuated before or after the shielding gas flow is established. The electrode is then touched to the work and withdrawn to establish the arc. The wire feed is started simultaneously with, or immediately prior to the establishment of the welding arc and the wire is fed toward the work continuously at a rate to maintain the arc. Muller et al., Patent No. 2,504,868, issued April 18, 1950, describes in detail a suitable mode of operation of the apparatus of Figs. 1, 2, and 3.

As previously stated, the invention can be utilized for the purpose of controlling the amount of heat liberated at one terminal of an inert gas shielded consuming electrode welding arc relative to the heat liberated at the other terminal of the same welding arc. In inert gas shielded metal arc welding of the common structural metals or cold cathode metals, when the work is made the cathode of a direct current arc and the consuming electrode wire is made the anode (i. e., reverse polarity), considerably more heat is liberated at the work than in the wire. By providing certain materials in the arc in very small amounts and in the manner to be hereinafter more fully described, all other conditions being the same, this invention enables the heat balance to be shifted in reverse polarity operations by any desired amount to the other extreme condition where the heat in the wire greatly exceeds the heat in the work. Similarly in inert gas shielded metal arc welding of the common structural metals where the wire electrode is made the cathode and the work is made the anode (i. e., straight polarity) considerably more heat is liberated in the wire than is liberated in the work—this to the extent of making the process in many instances practically inoperable. By providing certain materials in the arc in amounts and in the manner to be hereinafter more fully described, all other conditions being the same, this invention enables the heat balance to be shifted by any desired amount to make the process operable by reducing the heat in the wire relative to the heat in the work. By the proper selection and application of materials, a heat balance can be provided in the straight polarity inert gas shielded metal arc welding process with heat balance control additions that approximates the heat balance provided by the reverse polarity process with no additions present. In addition such materials act to eliminate the wild and erratic metal transfer, characterized by large misdirected globules of transferring metal and heavy weld spatter, that is otherwise inherent in straight polarity welding as described above, and instead produce a stable spray type metal transfer that approximates the spray type transfer provided by the reverse polarity process. Straight polarity inert gas shielded metal arc welding can thus be made a commercially satisfactory process.

EXAMPLE I

For example, it has been found that a weld can be made with a mild steel electrode wire on a steel plate with direct current straight polarity, in a process and apparatus of the type disclosed above and illustrated in Figs. 1, 2, and 3, if certain additions are made to the arc, without getting excessive wire burn off rates as have been found to occur when no such additions are made. This is illustrated by a test made with a 1/16 inch diameter mild steel electrode treated with a superficial addition of rubidium carbonate, said treated wire being fed to the arc through apparatus of the type disclosed above. Welding grade argon (99.5% pure) was used as the shielding gas at a flow rate of 75 cubic feet per hour through a 1 inch diameter nozzle to form a non-turbulent shielding gas flow stream. The welding current was 325 amperes D. C. straight polarity. Under such conditions with a normal arc length of about 3/16 inch the wire burn off rate (wire feed speed) was 150 inches per minute and the arc voltage was 20 volts. In order to obtain accurate and consistent test results the welding gun was held stationary and the work was moved under it mechanically at a weld travel speed of 10 inches per minute.

The rubidium carbonate was applied to the wire as follows (Figs. 4 and 5). The wire was first prepared by passing it through a pair of rolls, one of which was knurled, to form transverse impressions (about .005 inch deep and spaced apart by about 1/32 inch) on its surface (Fig. 5). The rubidium carbonate, in the form of a dry powder, was made into a slurry or paste by mixing it thoroughly with a quantity of denatured alcohol. This slurry or paste was then applied to the wire by brushing it onto the surface (Fig. 4) and into the transverse impressions on the wire surface. Following this step the wire was passed through a tightly-fitting annular rubber squeegee to remove the excess slurry. Next the wire was passed through a pair of smooth surfaced semi-circularly grooved rolls to smooth the surface roughness caused by the knurled roll and trap some of the addition material in the impressions. The surface of the wire was then wiped with a clean dry cloth to remove substantially all the rubidium carbonate except that which was trapped or impressed by the above treatment into the electrode surface. The alcohol evaporated leaving the wire dry. When prepared in the manner described, the wire has a substantially bare, electrically conductive surface and it can be readily fed through the welding apparatus; its ability to pick up the welding current from the contact tube is unimpaired. Since rubidium carbonate is a deliquescent material it may absorb considerable moisture when exposed to a humid atmosphere. This may result in some undesirable corrosion of the electrode wire which might interfere with the welding current transfer to the wire and which may also produce mechanical binding in the contact tube, because of a build up therein of the corrosion products. Also, the water present (hydrogen) has an adverse effect on the soundness of the weld deposit and the steadiness of the arc. However, this problem is easily avoided by keeping the dry prepared wire in a dry atmosphere. A compound of rubidium having substantially the same effect on the heat balance of the arc as the carbonate, but which is not as deliquescent, is the oxide.

Rubidium carbonate treated wire prepared and operated as above produces a good welding arc with spray type metal transfer from the wire to the work; the arc having much the appearance of the conventional high current density reverse polarity inert gas shielded metal welding arc with an untreated wire. The weld metal fuses into the plate well and produces a well formed high quality weld bead.

To demonstrate how much the minute amounts of rubidium carbonate on the wire reduce the heat liberated in the wire as the cathode of the straight polarity arc the following test was made. A clean bare 1/16 inch diameter mild steel electrode wire identical to the wire described above, but having no rubidium carbonate applied to it, was again made the cathode. The apparatus was the same as described above and the shielding gas composition and flow were held the same, namely, 75 cubic feet per hour of high purity argon. The weld travel speed was held at 10 inches per minute and the welding current at 325 amperes. The untreated wire under these conditions gave a wire burn off rate (wire feed speed) of 360 inches per minute and the arc voltage was 28 volts. This compares to a burn off rate of 150 inches per minute and an arc voltage of 20 volts with the rubidium carbonate treated wire. With the rubidium carbonate treated wire the arc operation was satisfactory and the weld produced was good. With the bare wire the arc was wild and erratic, the metal transfer poor (relatively heavy spatter and large drops), and the process practically inoperable. Fig. 6 illustrates a cross-section through the weld made according to the invention with the rubidium carbonate treated wire. Fig. 7 illustrates a cross-section through the comparison weld made under identical conditions but with the bare, untreated wire. While these sectional views do not illustrate entirely the unsatisfactory nature of the latter method, they do illustrate the excessive deposition rate and poor peneration. Generally speaking, to obtain good fusion of the transferred metal with the workpiece the heat liberated at the wire should not exceed the heat liberated at the plate by more than 50%. The marked difference between the treated and untreated wire in burn off and arc characteristics is believed to be attributable, in part at least, to the high thermionic electron emissivity of the rubidium carbonate treated steel at the welding temperature when used as the consumable cathode of the inert gas shielded metal welding arc.

EXAMPLE II

It has been found that similar effects can be produced by making additions according to the invention to a non-ferrous electrode wire. For example, aluminum can be welded with straight polarity according to the invention by making a cesium nitrate addition to the aluminum electrode wire, as shown by the following. A weld was made on an aluminum alloy plate with an aluminum alloy electrode, using welding grade argon (99.5% pure) as a shield gas delivered as a non-turbulent flow stream at 75 cubic feet per hour through a 1 inch diameter nozzle. The apparatus was substantially the same as that illustrated in Figs. 1, 2, and 3 and described hereinbefore. The electrode wire was a 1/16 inch diameter 43S aluminum wire having applied thereto a small amount of cesium nitrate. The plate on which the weld bead was deposited was 61ST aluminum 3/8 inch thick. The weld travel speed was 10 inches per minute. The cesium nitrate was applied to the wire in exactly the same manner described heretofor for the application of rubidium carbonate to the steel wire. Under these conditions and with an arc current of 220 amperes, straight polarity, the wire burn off rate (wire feed speed) was 160 inches per minute and the arc voltage 16 volts. The weld operating conditions were excellent with spray transfer from the metal from the electrode to the work, a quiet arc, and no spatter. Arc regulation was good (arc length and voltage remained substantially constant). The weld bead was well rounded and smooth.

To illustrate the effect in heat balance shift produced by this addition of cesium nitrate to the aluminum electrode wire a comparable straight polarity weld was attempted with an untreated aluminum electrode. The same apparatus and identical welding conditions were used with the exception that an untreated aluminum electrode was substituted for the cesium nitrate treated electrode. The resulting process was inoperable. The burn off rate was excessive, being well over 500 inches per minute. There was very poor arc regulation, the arc was wild and spatter profuse. The weld bead was irregular and not well fused into the plate but rather overlapped the plate and lacked adequate penetration. The arc voltage was considerably higher than that with the cesium nitrate treated wire, but because of the poor arc length regulation it was impossible to obtain a reliable arc voltage reading. The significant and conclusive difference between the process with the cesium nitrate treated wire and the untreated wire is that in the first the wire burn off rate was 160 inches per minute whereas in the second it was in excess of 500 inches per minute, indicating a vast difference in the amount of heat liberated in the wire as a cathode. In addition, transfer of metal in the first case was good and the process a commercially operable process, whereas in the second, transfer was poor and the process inoperable for practical purposes.

EXAMPLE III

The following is a further example of the application of the invention to non-ferrous metals. Welds were made on a steel plate using an aluminum bronze alloy wire electrode, both with the wire treated with cesium rubidium chloride and with an untreated wire. The particular wire employed was an alloy comprising approximately 9% aluminum and the balance copper. The wire was 1/16 inch in diameter, and the plate on which the weld bead was made was 3/8 inch thick mild steel. The welding apparatus and the gas shield were identical to those heretofore described. Cesium rubidium chloride was applied to the electrode wire in exactly the same manner as the rubidium carbonate in the first example in this specification. With the electrode wire connected as the cathode (straight polarity) and a welding current of 225 amperes, the treated wire burn off rate was 210 inches per minute at an arc voltage of 18 volts. Metal transfer across the arc was good, being in the form of a fast drop transfer. The bead was quite well faired into the plate and had an oval profile. Arc length regulation was good. When identical conditions were maintained, but an untreated wire employed, the burn off rate was 320 inches per minute at an arc voltage of 20 volts. The metal transferred across the arc in larger drops, the bead formed was irregular, and there was poor regulation of the arc. The deposited metal built up on the plate and did not fuse in well. The process was inoperable from a practical point of view. Again, it may be seen that considerably more heat was liberated in the wire as a cathode when the wire was untreated, as compared with the heat liberated in the wire having small quantities of cesium rubidium chloride associated therewith.

While heat balance shift is probably easiest to statistically describe in connection with the straight polarity arc because of the extreme differences in wire burn off rate, it is also present in the reverse polarity arc. As stated above, heat liberated at the anode of the welding arc is practically independent of the emissivity of the anode material, therefore the wire burn off rate should be substantially constant with reverse polarity (wire the anode) whether or not the additions of the present invention are made to the arc. This has been found to be true.

EXAMPLE IV

For example, a weld was made on a steel plate using a 1/16 inch diameter mild steel wire electrode having applied thereto a small quantity of barium oxide in the same manner as previously described, the wire being the anode (reverse polarity) in a gas shielded metal arc welding process of the type here under consideration. Using argon as the shielding gas at a flow rate of 50 cubic feet per hour through a 3/4 inch nozzle and using a 3/8 inch thick steel plate as the cathode a weld was made at a travel speed of 10 inches per minute. At 325 amperes the wire burn off rate was 202 inches per minute and the arc voltage 22 volts. The arc was quiet and stable with good regulation, and the metal transfer was of the spray type. The bead was well formed and the penetration moderate. There was no evidence of the positive ion bombardment ordinarily observed in the reverse polarity inert gas shielded process with an untreated electrode. By comparison, when an untreated wire was used under the same conditions and burn off rate was 210 inches per minute at an arc voltage of 28 volts. Metal transfer across the arc was of the spray type. The bead was somewhat flatter and the heat affected area in the plate was much greater. Positive ion bombardment produced the familiar cleaning action on the plate.

EXAMPLE V

Another example, using reverse polarity, with a non-ferrous material, is a weld made with a 1/16 inch diameter aluminum electrode wire, utilizing the same welding apparatus hereinbefore described. The gas shield was welding grade argon deliverd at 75 cubic feet per hour in an non-turbulent flow through a 1 inch diameter nozzle. A ⅜ inch thick aluminum plate was the cathode. When the wire was first treated by applying a small amount of cesium nitrate in the manner previously described the wire burn off rate was 165 inches per minute at 205 amperes and 19 volts. The resulting weld was good. When an untreated aluminum wire was used under the same circumstances the wire burn off rate was 175 inches per minute at 22 volts. The weld bead was somewhat flatter and the arc characteristics and metal transfer were good.

It is significant to note that when the wire is the anode the addition material has little or no effect on the wire burn off rate but the arc voltage is reduced by a substantial amount and the total arc power is considerably less. Since the wire burn off rate is substantially constant, it is evident that the heat in the work must be reduced. This is exactly what would be expected according to the invention if the work were made a better thermionic emitter. Therefore, it is clear that in these reverse polarity examples the addition made to the wire transferred to the weld pool with the depositing weld metal and increased the thermionic emission of the weld pool as a cathode. Thus, when additions are made to the wire according to the invention the heat liberated in the wire is substantially reduced where the wire is the cathode and the work the anode, and the heat liberated in the work can also be substantially reduced where the wire is the anode and the work the cathode.

It has been found that very small amounts of the addition materials are required to effect the desired results. It is clear from the preceding description of a method of application of the material to the wire which has been found satisfactory, that very little of the addition material remains on the wire in its finished, treated state. As a matter of fact, difficulty may be encountered in feeding the wire through the contact tube and transferring current to it if the added material is on the surface of the wire in sufficient quantity to rub off. An approximate chemical analysis of a sample of the barium oxide treated steel wire used successfully in one of the examples listed above, indicated that the barium oxide was present in the approximate amount of .055 pound per ton of steel, i. e., about .003% by weight of deposited weld metal, which is indicative of the fact that very small amounts of addition materials may be used. The treated wire can still be considered as a "bare" wire, and its surface is electrically conductive for pickup of the welding current as it is fed through the contact tube.

Not only can the heat balance of the inert gas shielded metal welding arc be shifted in a given direction according to the invention, as evidenced by the preceding examples, but quantitative control of the heat balance shift can be obtained by proper selection of the addition material.

That different addition materials produce different amounts of heat in the cathode under substantially identical conditions is demonstrated by the following experimental facts. The previously-described straight polarity welding process using a rubidium carbonate treated steel electrode (see Example I) produced a burn off rate of 150 inches per minute and an arc voltage of 20 volts. The comparable conditions for untreated wire produced a burn off rate of 360 inches per minute and an arc voltage of 28 volts. By keeping all welding conditions exactly the same, but substituting cesium rubidium chloride for the rubidium carbonate the burn off rate is 165 inches per minute with an arc voltage of 22 volts. When potassium carbonate is used as the addition material to the electrode the burn off rate is 265 inches per minute and the arc voltage is 28 volts.

Similarly, the straight polarity welding of aluminum, previously described (see Example II), produced with a cesium nitrate treated wire an operable process with a burn off rate of 160 inches per minute and an arc voltage of 16 volts. When an untreated wire was used under the same conditions the process was inoperable and the burn off rate was in excess of 500 inches per minute. By keeping all welding conditions exactly the same, but substituting "T-mixture" (a mixture of oxides of lanthanum and cerium primarily, but containing other rare earth oxides in small amounts) in place of the cesium nitrate, a burn off rate of 370 inches per minute and an arc voltage of 18 volts is produced, which is intermediate the untreated wire burn off and the wire with the cesium nitrate additions.

Similarly, with the treated aluminum bronze alloy electrode wire example (straight polarity) previously described (see Example III), the burn off rate was 210 inches per minute. The comparable burn off rate for untreated wire was 320 inches per minute. When a rubidium carbonate treated wire is substituted for the cesium rubidium chloride treated wire the burn off rate is 235 inches per minute, for the same welding conditions.

While certain specific addition materials for increasing thermionic emission have been included in the above examples, as illustrative of the operation and results of the invention, it is to be understood that the invention is not limited to said specific materials. Rather it is contemplated that the invention may be carried out with other addition materials which comprise or contain an emission agent or agents that cooperate with the cathode base metal to form a composite metal welding cathode surface which has a substantially higher thermionic emissivity at the welding temperature than the base metal alone. The increased thermionic emissivity of such a composite metal cathode surface is manifested by a substantially lower cathode work function and by a substantially lower cathode voltage drop as compared to the work function and cathode voltage drop of the base metal alone, at the welding temperature. The composite welding cathode surface comprises both the emission agent or agents and the cathode base metal. Base metals are, of course, the metals which form the workpiece or the metals which form the wire electrode and which are provided for fusion with the workpiece metals to form the weld deposit. The emission agents are metals added to the arc or to the welding electrode or electrodes in extremely small amounts (either as elements or in compounds which dissociate to liberate such elements in the arc) primarily for the purpose of altering the thermal and electrical characteristics of the arc. Base metals in a given welding operation are determined by the composition of the workpiece to be welded and by the composition of the weld deposit to be formed. Suitable emission agents are metals which should be electropositive with respect to the cathode base metal, they should have a low thermionic work function (lower than the work function of the base metal) and have a low ionization potential (their ionization potential preferably should be lower than the ionization potential of any of the other constituents of the arc atmosphere and preferably lower than the effective work function of the cathode base metal), and they should have a melting point lower than the boiling point of the cathode base metal and yet be sufficiently high boiling or non-volatile as to remain in place in the composite cathode surface for a sufficient length of time to increase thermionic emission of the composite cathode surface under welding conditions.

It has been determined from experimental results that the invention may be very effectively carried out with an emission agent which is an element selected from the group consisting of the alkali metals, the alkaline earth metals, lanthanum and the lanthanum series rare earth metals, actinium and the actinium series rare earth metals, scandium and yttrium. These elements can be added either in elemental or metallic form or in the form of compounds thereof which will either partially or wholly dissociate in the arc to liberate the said elements. For example, the oxides, carbonates, borates, phosphates, nitrates, silicates, or halides, of said elements can be used. Mixtures of two or more of said elements and/or compounds may be used and are often particularly effective. The alkali metals are lithium, sodium, potassium, rubidium, cesium and francium. The alkaline earth metals are calcium, barium, strontium and radium. Lanthanum series rare earths are cerium, praseodymium, neodymium, promethium, samarium, europium, gadolinium, terbium, dysprosium, holmium, erbium, thulium, ytterbium, lutecium. Actinium series rare earth metals are thorium, protactinium, uranium, neptunium, plutonium, americium, and curium.

Many of the elements and compounds thereof in the periodic groups listed immediately above are rare and expensive, and some are dangerously radioactive. Therefore, it is preferred both for practical reasons and also because particularly beneficial and highly desirable results may be obtained therefrom in the inert shielded metal arc welding of the common structural metals to use an emission agent which is an element selected from the group consisting of potassium, rubidium, cesium, strontium, barium, lanthanum or lanthanum rare earth mixtures and cerium; thorium and uranium may be preferred in some instances, where the welding electrode temperatures are high. Again, these preferred emission agents may be added either in elemental form or in the form of compounds thereof which will wholly or partially dissociate in the arc to liberate said elements. For example, the oxides, carbonates, borates, phosphates, nitrates, silicates, or halides of said elements can be used. Mixtures of two or more of said preferred elements and/or compounds may be used and are often particularly effective.

Specific examples of presently preferred addition materials are cesium nitrate, rubidium carbonate, cesium-rubidium chloride, barium oxide or carbonate, barium-strontium mixtures in the form of oxides or carbonates, lanthanum and lanthanum series rae earth mixtures in metallic and oxide forms, thorium oxide and potassium carbonate.

The same addition materials are not equally effective on all workpiece and electrode wire compositions. This is illustrated by Figs. 8, 9, 10, 11 and 12 of the drawings which show by way of changes in wire burn off rate the effect of different addition materials on the heat balance of the inert gas shielded metal welding arc. While all the principles or theory of operation of the invention may not yet be fully understood, the following explanation of the manner in which the invention works has been found in practice to be useful as a guide to determine which of the various additional materials and emission agents to use, in the welding of a particular workpiece base metal or with a particular wire electrode base metal, to accomplish the desired results. The addition materials of the present invention are materials that break down (if a compound) into a metallic emission agent or element, of low work function and low ionization potential, which is electropositive with respect to the cathode base metal and which provides a thin film over all or part of the electrode (cathode) surface during the welding operation. The coating of an electropositive metal on a more electro-negative one produces a marked lowering of the work function of the composite surface, resulting in effect in increased thermionic emission at welding electrode temperature. The process is believed to proceed as follows. The compound containing the emission agent or element (assuming the emission agent is added to the arc in the form of a compound) is reduced or dissociated and frees the emission agent as a metal in or on the molten portion of the welding cathode. The emission element diffuses to the molten cathode surface and/or migrates over said surface to form a composite, highly thermionically emissive, welding cathode surface. It appears that the fully activated surface corresponds to a monatomic layer of atoms or ions of the emission agent which covers a large part, for example more than 50% of the cathode surface. This thin layer of the emission element is held on the surface with attractive forces so strong that substantial evaporation does not begin until temperatures are reached that are well above the boiling point of the emission element, though excess quantities of the element may evaporate at low temperatures to leave said thin layer or patches of the element on the cathode surface. It should be noted that the temperatures of the welding arc, usually operated at atmospheric pressures, are above the dissociation points of most compounds. The monatomic layer or patches of atoms of the emission element is believed adsorbed as ions on the base metal cathode surface and the forces which tend to hold it in place should be highest when the ionization potential of the emission element is low; it would appear that the ionization potential of the emission element should be less than the work function of the cathode base metal but in practice, possibly because work functions are difficult to determine accurately, it has been found that the ionization potential of the emission metal may sometimes be as high as one and one-half electron volts greater than the values given by reliable investigators for cathode base metal work functions. In general, the emission element must be electropositive with respect to the base metal; the work function of the composite surface is lowest and its thermionic emissivity is highest when this difference is at its largest positive value and the work function becomes higher and thermionic emissivity lower as the difference reaches zero and becomes negative.

Ionization potentials of many of the emission elements included in this invention have been determined with reasonable accuracy but, as stated above, there is a fairly wide variation in the work functions of the base metal as measured by different investigators. The following is a list, taken from the literature, of ionization potentials of some of the emission elements and work functions of several base metals:

*Ionization potentials*

| Emission agents: | Electron volts |
|---|---|
| Lithium | 5.37 |
| Sodium | 5.12 |
| Potassium | 4.32 |
| Rubidium | 4.16 |
| Cesium | 3.87 |
| Strontium | 5.67 |
| Barium | 5.19 |
| Scandium | 6.7 |
| Yttrium | 6.5 |
| Lanthanum | 5.59 |
| Thorium | 5.25 |

*Thermionic work functions*

| Base metals: | Electron volts |
|---|---|
| Magnesium | 3.78 |
| Aluminum | 4.08 |
| Copper | 4.33 |
| Iron | 4.48 |

While cesium would appear to provide the best thermionic composite surface emitter for any of the base metals on the basis of the above list, cesium has a low boiling point and is not retained well on the higher boiling base metals such as iron during welding conditions. Cesium is very effective on the lower boiling metals such as aluminum. Barium, strontium, lanthanum and cerium would be expected to be much more effective as composite surface emitters with iron than with aluminum and this has been shown to be true by actual test. Those emission agents having the lower ionization potentials are particularly beneficial when used with shielding gases such as helium having relatively poor ionization characteristics.

Usually only the emission agent can be selected for the composite surface when the present invention is applied to practical operations, because the cathode base metal is determined by the electrode wire composition or the workpiece composition, which in turn is determined by the type of weld to be made or the type of work to be welded. Furthermore, the cathode surface must operate at some temperature between the melting and boiling points of the wire compositions, so that the electrode wire metal may be melted and transferred across the arc gap and deposited in the molten weld metal on the workpiece. Current densities preferably should be high, with wire feed speeds of 100 inches per minute or more, as disclosed in the Muller et al. patent No. 2,504,868, though by the use of the present invention the lowering of the cathode work function and cathode voltage drop and consequent reduction in arc voltage drop results in higher current flows for the same heat or power release in the arc. Also, the beneficial effects in arc stabilization and on metal transfer produced by materials added to the arc according to the present invention can provide satisfactory arc characteristics at lower currents, which is particularly useful in the welding of thin sheet.

The fact that welding arcs are normally operated at substantially atmospheric pressure is a factor to be considered because the boiling point of the emission agent should be high, to keep it intact on the cathode surface for a sufficient length of time, and the temperatures and boiling points to be considered should therefore be those at atmospheric pressure. Because the addition material is continuously fed to the arc the emission element on the composite cathode surface is continuously replenished and hence need have only a short effective life; emission agents that have boiling points considerably below the welding cathode temperatures can, if continuously added to the arc, act to maintain a constantly effective, thermionic, composite cathode surface, even though the cathode base metal is rapidly being removed or added to during the welding operation by the transfer of metal from the electrode wire to the weld deposit on the workpiece.

The activation treatment (reduction or dissociation of the addition material if in compound form and migration of the emission element over the cathode surface in a monatomic layer) must take place as the wire is fed into the arc. It is important that the emission element chosen be capable of being held in a thin adsorbed layer on the base metal at its welding temperature because it is at such temperature (between the base metal melting and boiling temperatures) that the welding cathode surface operates and therefor it is at such temperature that the composite surface must be effective. If the addition material is fed into the arc in compound form such compound should not be so stable that it will not dissociate at least in part to provide the free emission element or metal at the electrode surface or surfaces of the arc; on the other hand if a compound is used it preferably should not dissociate so readily as to permit complete evaporation of the emission element before it can reach the cathode surface and be adsorbed on the surface as ions. Where the addition material is a compound it can be considered as having an "effective end" which is the emission element and a "carrier end" which is the element or group that carries the emission element to its place in the composite surface.

Figure 13:
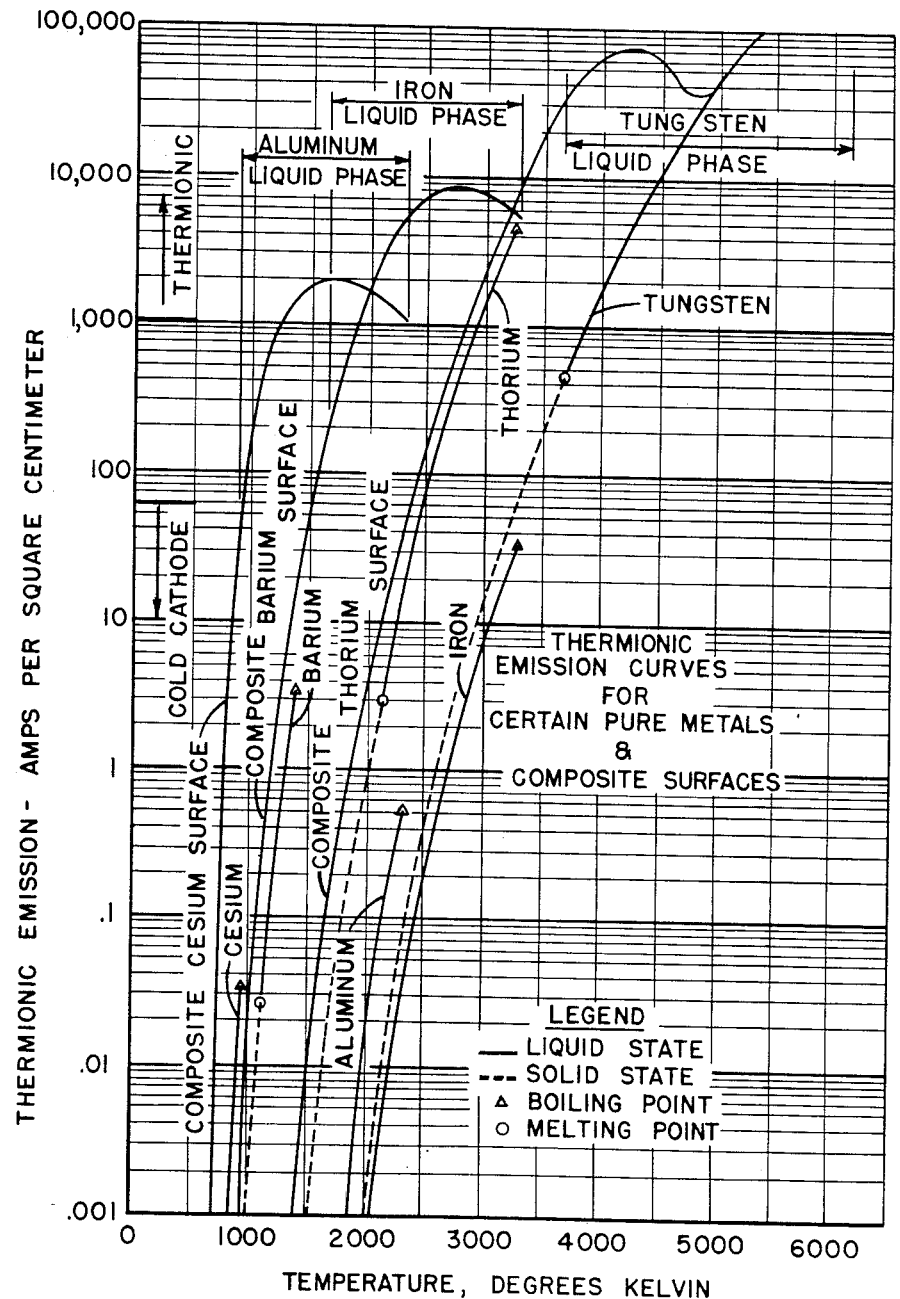
Fig. 13 shows qualitatively cathode thermionic emission rate plotted on an eight cycle log ordinate against cathode temperature on a linear abscissa for certain cathode materials and composite cathode surfaces as illustrative of the operation of the present invention.

To illustrate the effect of composite cathode surfaces for controlling and improving thermionic electron emission in the welding arc, a chart is shown in Fig. 13. In this figure thermionic emission rates of two base metals (aluminum and iron) and two emission agents (cerium and barium) are plotted against temperature. The composite surface thermionic emission from cesiated and bariated cathode surfaces are also plotted to illustrate the principle involved. It must be emphasized that these curves are merely illustrative of the invention and are not quantitatively exact. They illustrate qualitatively the relation between the thermionic emission rates of various surfaces but the quantitative relationships shown are not exact as the work function of a composite cathode surface varies with base metal composition, as well as with the emission element used. The work function of a thermionic composite surface is lower than that of either the base metal or the emission element per se. While the coating metal or emission agent is held in an adsorbed layer on the base metal far above its boiling temperature, if high enough temperatures are reached the adsorbed layer is lost too quickly, due to evaporation and in such case the thermionic emission is substantially identical to that of the base metal alone. The emissivity curve for the refractory and thermionic metal tungsten and for thoria on tungsten is included to show this effect. At the top of the chart the melting and boiling points for aluminum and iron are indicated. Since the electrode temperatures of the welding arc for these materials must lie within the ranges indicated in the inert gas shielded metal arc welding process, it is apparent that cesium would be most effective on aluminum and barium most effective on iron.

Figure 17:
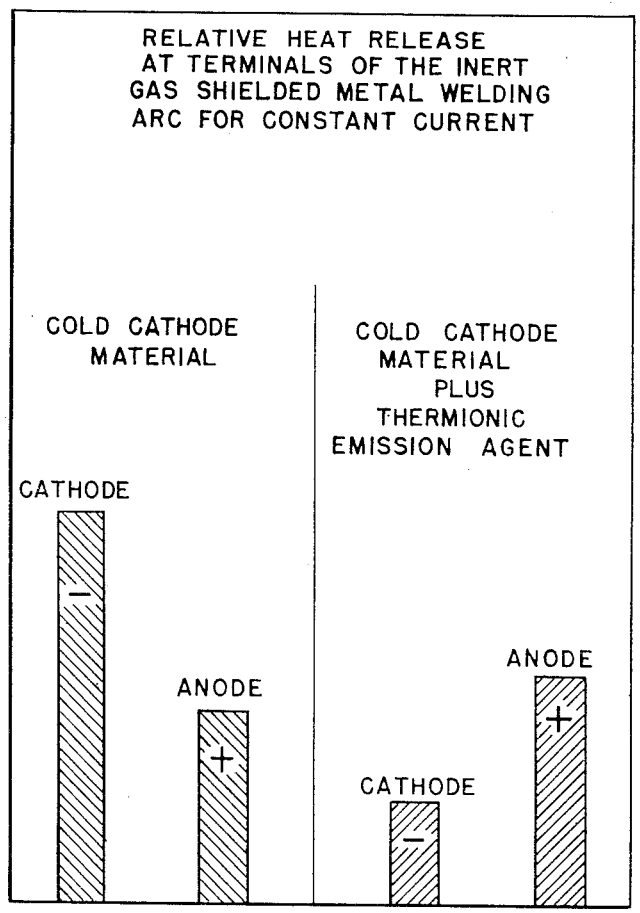
Fig. 17 illustrates the relative heat release at the terminals of inert gas shielded metal welding arcs for constant current.

The resulting effect on the heat balance of the inert gas shielded metal welding arc of such thermionic cathode emitters, as compared with the cold cathode base metals, is illustrated in Fig. 17.

As an alternative to the preparation method of Fig. 4, in which the material is applied to the surface of the wire or embedded in surface identations therein, the addition material may be added to the melt when the wire is being manufactured, to form an alloy or mixture therewith. This provides homogeneous distribution of the addition material through the wire and eliminates the need for separate processing of the wire subsequent to its manufacture in wire form.

EXAMPLE VI

For example, misch metal was added to a 95 pound heat of molten mild steel in an amount of 4 pounds of misch metal per ton of molten steel. Misch metal consists of 52% cerium, 33% lanthanum, 1.5% iron and the balance rare earths. The resultant alloy (some of the misch metal was lost through vaporization) was drawn into 1/16 inch diameter wire which was used as a consuming electrode in an inert gas shielded metal arc welding process of the type here under consideration with straight polarity. With an argon shielding gas flow of 75 cubic feet per hour through a 1 inch nozzle a weld was made on a 3/8 inch thick steel plate at a weld travel speed of 10 inches per minute. At a welding current of 310 amperes the wire burn off rate was 140 inches per minute and the arc voltage 25 volts. This compares with a burn off rate of approximately 335 inches per minute for wire not containing misch metal under similar welding conditions. The welding conditions for the wire, composed of misch metal treated steel, were good. Transfer was of the spray type and the weld bead was well formed.

While it is presently preferred to practice the invention by applying or embedding the addition materials to or in the wire surface or by adding these materials to the wire composition as an integral part thereof, these addition materials can also be added to the arc in other ways.

Fig. 14 illustrates diagrammatically one such alternative in which the addition materials are introduced continuously into the shielding gas stream. In this figure an untreated wire electrode 60 is fed through a welding gun 61 to operative position with respect to work 62. In the same manner as previously described for the manual gun the electrode wire 60 is provided on a reel 63 from which it is withdrawn by a motor driven wire feed mechanism 63. The wire is then pushed through a casing 64 to the welding gun 61. Welding current is provided by a conventional direct current welding generator 66. One terminal of the generator is connected to the welding gun 61 through a contactor 67 and conductors 68 and 68'. The other terminal of the welding generator is connected to the work 62 by conductor 69. The welding current is transferred to the electrode 60 within the gun 61 by a contact tube in the same manner as in the gun of Fig. 2. The welding gun may be water cooled, as indicated by the cooling water connections on the nozzle. The welding gun illustrated is supported in a fixed holder comprising a split sleeve 70 having a pinion gear rotatable by means of a hand wheel 71. A rack 72 is attached to the barrel of gun 61 so as to engage the pinion gear enabling the gun to be adjusted vertically within the split sleeve. Fig. 15 illustrates in some detail the construction of the lower portion of the gun 61. The wire is fed through an inner barrel 75 and a contact tube 76 which transfers the welding current to the electrode 60. The welding current enters the gun at the top from conductor 68' and is conducted through the internal metal parts of the gun to the contact tube 76.

Referring again to Fig. 14, shielding gas is supplied from a compressed gas cylinder 80. It is discharged from the cylinder through the conventional cylinder valve 81, pressure regulator 82, and flow meter 83 into gas conduit 84. From conduit 84 the shielding gas is discharged into a vibratory powder dispensing device 85. This device is disclosed in detail in United States Patent No. 2,549,033, issued April 17, 1951 to Joseph H. Tyrner. Basically it consists of a hopper from which the powdered material is dispensed by a vibrator dispensing mechanism. The powdered material is picked up by the inert gas stream as the gas, which was fed to the device from conduit 84, leaves the device from conduit 86. Shielding gas with suspended powdered material passes through conduit 86 from the powder dispenser 85 to the welding gun 61. In this form of the invention the addition material is provided in the form of a dry powdered solid which is introduced into the shielding gas stream. The shielding gas, with the addition material suspended therein, passes through the appropriately provided passages of gun 61 and emerges as a non-turbulent stream from the annular nozzle 89 (Fig. 15) surrounding contact tube 76. The addition material suspended in the shielding gas stream continuously enters the arc region to provide therein a stabilizing substance of low ionization potential and to impart to the cathode thermionic emissive properties as described heretofore. The powder dispensing device 85 need not be of the type disclosed in Tyrner Patent No. 2,549,033 but may be any apparatus which will provide a continuous feed of powder to the arc.

EXAMPLE VII

The following is an example of the operation and results of the invention when the addition material is added to the arc as a dust suspended in the shielding gas. A straight polarity welding arc was established between a 1/16 inch diameter mild steel untreated wire electrode (the cathode) and a 3/8 inch thick steel plate (the anode). Barium oxide in the form of a fine dry powder was carried to the arc in the shielding gas which was welding grade argon fed at 75 cubic feet per hour through a 1 inch diameter nozzle. At 300 amperes the wire burned off at 190 inches per minute and the arc voltage was 22 volts. With all other conditions the same, but no dust in the shielding gas the wire burn off rate was 310 inches per minute and the arc voltage 30 volts.

A reverse polarity welding arc established with the same conditions, having barium oxide dust suspended in the shielding gas, gave results similar to those obtained on reverse polarity with barium oxide applied to the electrode wire.

Beside the above-described modes of introducing the addition material to the arc for the purposes herein described, it has been found that under certain conditions the addition material can be put on an auxiliary filler wire that is fed to the weld, or the addition material may be placed on the work directly.

Figure 16:
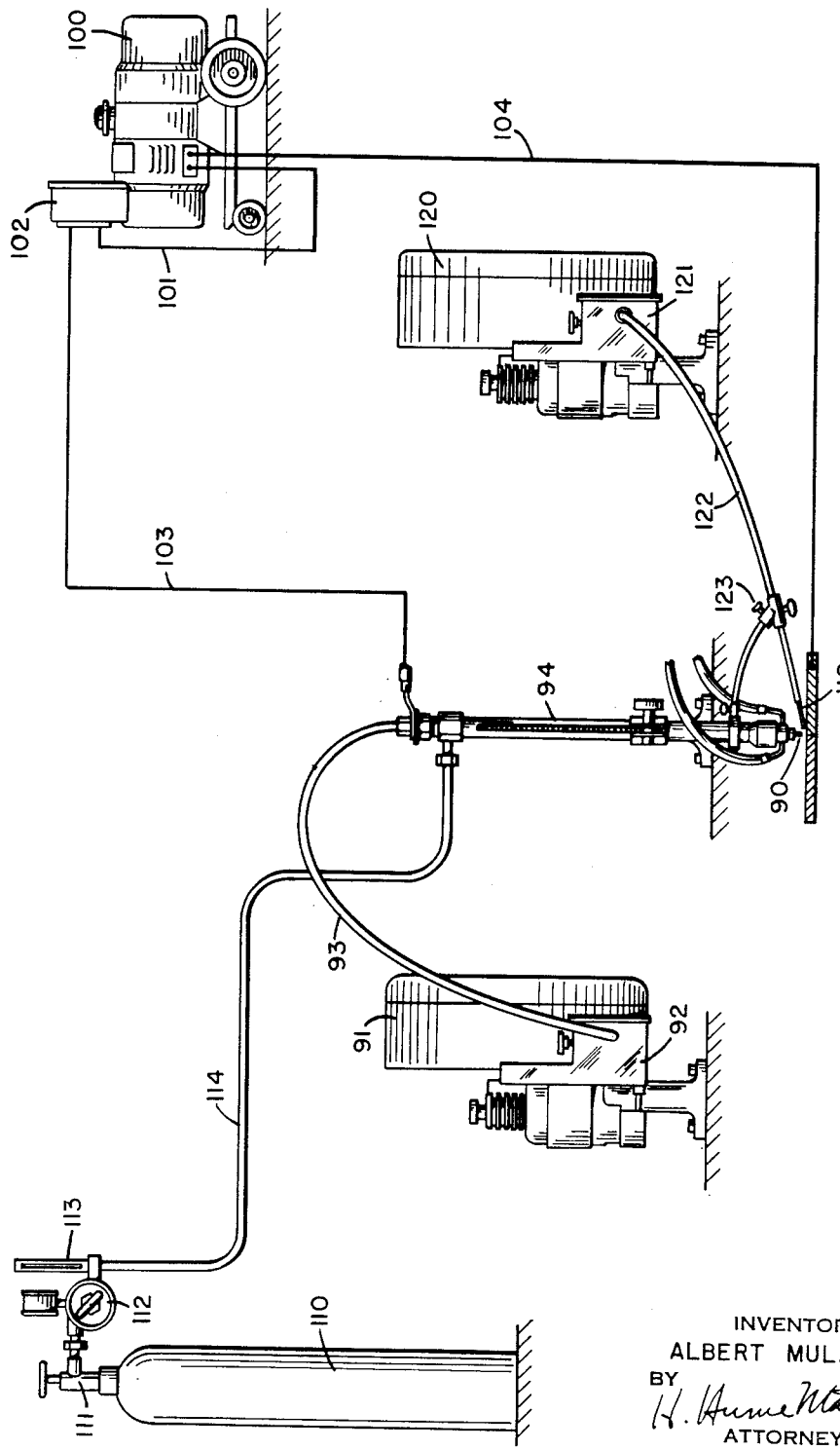
Fig. 16 illustrates another modified apparatus set-up suitable for the practice of the invention.

Fig. 16 illustrates suitable apparatus employing an auxiliary filler wire to which addition materials of the type hereinbefore described have been applied.

Referring to Fig. 16 electrode wire 90 is fed from a reel 91 by a motor-driven feed mechanism 92 as in the previously-described embodiments. In this case the electrode is clean bare untreated wire. It is guided from the feed mechanism 92, through a casing 93 to a welding gun 94 of the machine type. This welding gun may be identical in itself to the gun disclosed in Figs. 14 and 15 and described herein. The welding current is provided from a welding generator 100. One terminal of the generator is connected to the welding gun by conductor 101, contactor 102, and conductor 103. The current is transferred to the electrode wire 90 within the welding gun 94. The other terminal of the welding generator is connected to the work by conductor 104. Shielding gas is provided from a compressed gas cylinder 110 through a conventional cylinder valve 111, pressure regulator 112, flow meter 113, and conduit 114 to the welding gun 94. The shielding gas emerges from the gun nozzle as a non-turbulent flow stream enveloping the arc end of the electrode, the arc, and the weld puddle. A second wire feed unit is employed in this embodiment of the invention to feed a filler wire 119 to the weld, which wire contains in the body of the wire or on or embedded in its surface, the necessary addition material. This treated wire 119 is not electrically energized and is not an electrode. It is an independent wire fed to the arc region where it is melted into the weld by the heat of the arc. The wire feed unit may be identical to the electrode wire feed unit. It comprises a wire reel 120 and a motor-driven wire feed mechanism 121. The feed mechanism withdraws the wire 119 from reel 120 and pushes it through a casing 122 to the weld zone. A fixture 123 supports the casing 122 in the vicinity of the torch and thereby guides the filler wire 119 into the weld. Best results are obtained if the filler wire 119 is fed to the weld zone in such a manner that the end of the wire touches the work at the edge of the weld puddle and melts off in the weld puddle before it gets directly under the arc. The addition materials forming part of this filler wire provide the required thermionic emission rate at the cathode in much the same manner as the addition materials on the electrode wire of the previously-described embodiment of the invention.

EXAMPLE VIII

The following example shows the effect produced on a reverse polarity inert gas shielded metal arc with an addition made to an auxiliary filler wire. With apparatus as shown in Fig. 16 a $1/16$ inch diameter mild steel electrode was used in an argon shield with a gas flow rate of argon of 75 cubic feet per hour in laminar flow through a 1 inch diameter nozzle. With no auxiliary filler wire feed and with a given welding generator setting the welding current was 285 amperes, the arc voltage 29 volts, and the electrode wire burn off rate 175 inches per minute. An auxiliary filler wire comprising a .045 inch diameter steel wire was treated with barium oxide in exactly the same manner heretofore described for treating a $1/16$ inch steel electrode with rubidium carbonate. This auxiliary filler wire was fed to the arc to melt off in the weld pool and supplement the weld metal provided by the consuming electrode. When this barium oxide treated wire was added to the weld at a feed rate of 90 inches per minute, and the welding generator setting kept constant, the welding voltage immediately dropped to 25 volts, the current increased to 325 amperes and the burn off rate went up in the customary manner for the increase in welding current, to 225 inches per minute. The barium oxide on the auxiliary filler wire therefor was effective to increase the emissivity of the weld pool just as when the barium oxide or other addition material is applied to the electrode wire or carried to the arc as a dust suspended in the shielding gas.

EXAMPLE IX

In some instances the invention can also be practiced by applying the addition material directly to the plate. For example, using apparatus of the type disclosed in Fig. 1, a slurry of barium oxide and alcohol was applied by a brush to a portion of a steel plate to be welded. The alcohol evaporated leaving a superficial coating of barium oxide adhering to the plate. An inert gas shielded metal arc weld made with reverse polarity on this portion of the plate gave an arc voltage of 22 volts and an arc current of 350 amperes. When the weld was run off the treated portion of the plate onto a clean bare portion the arc voltage jumped up to 30 volts and the current decreased to 290 amperes, indicating that the weld pool as the cathode is a much improved thermionic emitter when barium oxide is applied to the plate.

While certain specific examples and embodiments of the invention have been described above for the purpose of illustrating its nature and operation, it is to be understood that the invention may also be utilized and practiced by those skilled in the art in other ways without departing from its spirit or scope as defined by the following claims.

I claim:

1. A method of electric arc welding comprising supplying direct current to a consuming wire electrode and a workpiece, feeding said wire toward said workpiece to maintain said arc as metal is transferred from said electrode to said workpiece, shielding the end of said electrode, the arc, and the molten metal produced thereby with a flowing stream of inert gas, and supplying to said arc a substance comprising a metal selected from the group consisting of the alkali metals, the alkaline earth metals, lanthanum and the lanthanum series rare earth metals, actinium and the actinium series rare earth metals, scandium, and yttrium.

2. A method of electric arc welding comprising supplying direct current to a consuming wire electrode and a workpiece, feeding said wire toward said workpiece to maintain said arc as metal is transferred from said electrode to said workpiece, shielding the end of said electrode, the arc, and the molten metal produced thereby with a flowing stream of inert gas, and supplying to said arc a substance comprising a metal that is electropositive with respect to the base metal of the negative terminal of said arc and has a lower work function than said base metal and that is selected from the group consisting of the alkali metals, the alkaline earth metals, lanthanum and the lanthanum series rare earth metals, actinium and the actinium series rare earth metals, scandium and yttrium.

3. In a process for gas shielded metal arc welding wherein an electrode wire having an electrically conductive surface is continuously consumed by an inert gas shielded welding arc maintained by direct current continuously supplied to said wire electrode through its conductive surface at a location adjacent the arc end thereof, the improvement which comprises continuously introducing into said arc as said wire electrode is consumed thereby a substance selected from the group consisting of the alkali metals, the alkaline earth metals, lanthanum and the lanthanum series rare earth metals, actinium and the actinium series rare earth metals, scandium, and yttrium, said substance being introduced in the form of a compound that breaks down in the arc region to produce a composite arc cathode surface which acts to reduce the heat liberated at the arc cathode to a value substantially below that which would be liberated at the arc cathode in the absence of such substance.

4. In a gas shielded metal arc welding process in which a direct current arc is maintained between a consuming ferrous metal wire electrode and a workpiece, and the end of the electrode, the arc and the weld puddle formed by the arc are shielded from the ambient atmosphere by a flowing stream of inert gas, the improvement which comprises supplying to the region of said arc a compound of a metal which is electropositive with respect to the base metal of the negative terminal of said arc, which has a lower work function than the base metal of the negative terminal of said arc, and which is selected from the group consisting of potassium, rubidium, cesium, strontium, barium, lanthanum, and cerium, said compound dissociating in the region of the said arc to produce a composite arc cathode surface having substantially increased thermionic emissivity as compared with the thermionic emissivity of the base metal of the negative terminal of the arc alone.

5. A method of electric arc welding comprising supplying straight polarity direct current to a workpiece and a consuming wire electrode, said wire electrode being composed of a metal selected from the group consisting of aluminum, copper, nickel, iron, magnesium, titanium, and alloys of said metals, feeding said wire electrode toward said workpiece at a rate of the order of 100 inches or more per minute to maintain said arc as metal is transferred from said electrode to said workpiece, shielding the end of said wire electrode, the arc, and the molten weld metal produced thereby with a flowing stream of argon, and continuously adding to the molten end of said wire electrode during the welding process a metal selected from the group consisting of potassium, rubidium, cesium, strontium, barium, lanthanum, and cerium to produce a projected spray of metal droplets having a diameter less than the diameter of said wire electrode axially from said wire electrode to said workpiece.

6. A process for welding metals selected from the group consisting of aluminum, nickel, copper, iron, magnesium and titanium, which comprises establishing an inert gas shielded welding arc between a bare consumable wire electrode composed of at least one of said metals as a cathode and a workpiece as an anode, and continually feeding to the arc cathode surface a carrier compound containing an arc control metal which is liberated at the arc cathode by dissociation of said carrier compound in the heat of the arc, said control metal being electropositive with respect to said electrode metal and having a lower work function than said electrode metal and being selected from the group consisting of the alkali metals, the alkaline earth metals, lanthanum and the lanthanum series rare earth metals, actinium and the actinium series rare earth metals, scandium, and yttrium.

7. A method of electric arc welding with a bare wire consuming electrode connected to a source of welding current wherein an arc is struck between said electrode and a metal workpiece connected to said source and an inert gaseous medium is simultaneously fed to shield the arc, characterized by feeding the wire electrode toward the arc at a rate of at least 100 inches per minute, introducing into said arc region a substance comprising a metal selected from the group consisting of the alkali metals, the alkaline earth metals, lanthanum and the lanthanum series rare earth metals, actinium and the actinium series rare earth metals, scandium, and yttrium, and simultaneously supplying direct current from said source to the electrode and workpiece at reverse polarity and at a strength sufficient to both consume the wire electrode at said rate and also project molten metal axially from the wire electrode to the workpiece in the form of a spray of fine discrete droplets within the gas shield.

8. A method of electric arc welding with a bare wire consuming electrode connected to a source of welding current wherein an arc is struck between said electrode and a metal workpiece connected to said source and an inert gaseous medium is simultaneously fed to shield the arc, characterized by feeding the wire electrode toward the arc at a rate of at least 100 inches per minute, introducing into the arc region a substance comprising a metal selected from the group consisting of the alkali metals, the alkaline earth metals, lanthanum and the lanthanum series rare earth metals, actinium and the actinium series rare earth metals, scandium, and yttrium, and simultaneously supplying direct current from said source to said electrode and workpiece at straight polarity and at a strength sufficient to both consume the wire electrode at said rate and also project molten metal axially from the wire electrode to the workpiece in the form of a spray of fine discrete droplets within the gas shield.

9. A process for welding materials selected from the group consisting of aluminum, nickel, copper, iron, magnesium and titanium, and alloys of said metals, which comprises establishing a welding arm between a consumable wire electrode of one of said materials as a cathode and a workpiece to be welded as an anode, shielding the end of said electrode, the arc, and the molten weld metal produced thereby with a flowing stream of inert gas, continually feeding to the cathode surface a carrier compound containing an arc control metal which is liberated at the arc cathode by dissociation of said carrier compound in the heat of the arc, said control metal being electropositive with respect to the base metal and having a lower work function than said base metal and being selected from the group consisting of the alkali metals, the alkaline earth metals, lanthanum and the lanthanum series rare earth metals, actinium and the actinium series rare earth metals, scandium and yttrium, and supplying direct current to said arc at a strength to maintain said arc and project molten metal axially from said electrode to the workpiece in the form of a spray of fine discrete droplets within the inert gas shield.

10. A process for inert gas shielded direct current electric arc welding in which a welding arc formed between a consuming electrode and a workpiece is shielded from the ambient air by inert gas, characterized by delivering to the arc atmosphere as an ingredient in said shielding gas a substance comprising a metal selected from the group consisting of the alkali metals, the alkaline earth metals, lanthanum and the lanthanum series rare earth metals, actinium and the actinium series rare earth metals, scandium, and yttrium.

11. In a process for electric welding the steps including depositing metal on a workpiece by maintaining a direct current electric arc between a workpiece element and a consuming electrode element from which the deposited metal passes to the workpiece, maintaining an annular substantially non-turbulent stream of inert gas axially of said electrode whereby atmospheric constituents are substantially completely excluded from the arc and weld and the heat liberated at the cathode is therefore substantially greater than the heat liberated at the anode, feeding the consuming electrode toward the workpiece to maintain the arc, and increasing the emissivity of whichever element is cathodic by continuously feeding to the arc along with said electrode a substance comprising a metal selected from the group consisting of potassium, rubidium, cesium, strontium, barium, lanthanum, and cerium to increase the thermionic emissivity of said cathode element under the conditions existing in the arc atmosphere, and maintaining a welding current density in the electrode at a sufficient value to consume said electrode at a rate of at least 100 inches per minute.

12. In a process for electric welding the steps including depositing metal on a workpiece by maintaining a straight polarity direct current electric arc between a workpiece element and a consuming electrode element from which the deposited metal passes to the workpiece, maintaining an annular substantially non-turbulent stream of inert gas axially of said electrode whereby atmospheric constituents are substantially completely excluded from the arc and weld and the heat liberated at the cathode is therefore substantially greater than the heat liberated at the anode, feeding the consuming electrode toward the workpiece to maintain the arc, and increasing the emissivity of the cathode by continuously feeding to the arc along with said electrode a substance comprising a metal selected from the group consisting of potassium, rubidium, cesium, strontium, barius, lanthanum, and cerium to increase the thermionic emissivity of said cathode under the conditions existing in the arc atmosphere and to concentrate the arc cathode spot to substantially improve the transfer of metal from said electrode to said workpiece, and maintaining a welding current density in the electrode at a sufficient value to consume said electrode at a rate of at least 100 inches per minute.

13. A process of electric arc welding which includes forming a direct current arc between a non-ferrous workpiece and a consumable depositing non-ferrous electrode, shielding the arc, the electrode and the molten metal from atmospheric air by a stream of inert gas, and increasing the emissivity of the cathode of the arc by adding to the cathode base metal a minute quantity of an emission agent selected from the group consisting of potassium, rubidium, cesium, barium, strontium, lanthanum, and cerium to provide a cathode of base metal-emission agent which has a substantially greater thermionic emissivity and a substantially lower cathode heat release under the conditions existing in the arc than would said base metal alone.

14. In an inert gas shielded arc welding method in which a straight polarity inert gas shielded welding arc is maintained between a substantially bare consumable wire electrode as a cathode and a workiece as an anode and in which the materials of said electrode and workpiece are such and the inert shielding gas and welding current are such as to result in a heat release at the arc cathode that is so greatly out of balance with respect to the heat release at the arc anode as to result in burn-off of the wire electrode at a rate greater than can be accepted on the plate to make a well formed weld, the improvement which comprises adding to the arc cathode a material selected from the group consisting of the alkali metals, the alkaline earth metals, lanthanum and the lanthanum series earth metals, actinium and the actinium series rare earth metals, scandium, and yttrium, to form a composite arc cathode surface effective to reduce the burn-off rate of said wire electrode to a value compatible with the heat developed at the plate to enable a sound well formed weld bead to be produced.

15. A method of electric arc welding with a bare wire consuming electrode comprising essentially iron connected to a source of welding current wherein an arc is struck between said electrode and a metal workpiece connected to said source and argon gas is simultaneously fed to shield the arc, characterized by feeding the wire electrode toward the arc at a rate of at least 100 inches per minute, introducing into the arc region a substance comprising rubidium and simultaneously supplying direct current from said source to said electrode and workpiece at straight polarity and at a strength sufficient to both consume the wire electrode at said rate and also project molten metal axially from the wire electrode to the workpiece in the form of a spray of fine discrete droplets within the gas shield.

16. A method of electric arc welding with a bare wire consuming electrode comprising essentially aluminum connected to a source of welding current wherein an arc is struck between said electrode and a metal workpiece connected to said source and argon gas is simultaneously fed to shield the arc, characterized by feeding the wire electrode toward the arc at a rate of at least 100 inches per minute, introducing into the arc region a substance comprising cesium and simultaneously supplying direct current from said source to said electrode and workpiece at straight polarity and at a strength sufficient to both consume the wire electrode at said rate and also project molten metal axially from the wire electrode to the workpiece in the form of a spray of fine discrete droplets within the gas shield.

17. An inert gas shielded straight polarity metal arc welding process in which a welding arc of the spray transfer type is maintained in an inert gaseous atmosphere between an arc anode on a workpiece and a composite surface arc cathode on the end of a continuously fed consumable electrode having a conductive surface through which welding current is supplied to said electrode at a location adjacent the arc and which is comprised of weld metal to be deposited on the workpiece by the action of the arc, said composite surface arc cathode being formed of a molten body of said electrode weld metal and a metal selected from the group consisting of the alkali metals, the alkaline earth metals, lanthanum and the lanthanum series rare earth metals, actinium and the actinium series rare earth metals, scandium, and yttrium.

18. A process for the straight polarity inert gas shielded metal arc welding of the common structural metals such as aluminum, copper and iron comprising, establishing a straight polarity welding arc in an inert gaseous atmosphere between a workpiece and a consumable electrode fed continuously to the arc at a rate of at least 100 inches per minute and having an electrically conductive surface through which the welding current is supplied to said electrode at a location adjacent the arc end thereof, said electrode being comprised of one of said structural metals as a base weld metal and having uniformly distributed along the length thereof an arc control metal which cooperates with said base metal in the molten cathode area at the arc end of said electrode to form a composite thermionic emitter which has a thermionic emission rate at the welding temperature which is not substantially less than 1000 amperes per square centimeter, said arc control metal being selected from the group consisting of potassium, rubidium, cesium, strontium, barium, lanthanum, and cerium.

19. An inert gas shielded straight polarity metal arc welding process in which a welding arc of the spray transfer type is maintained in an inert gaseous atmosphere between a workpiece as an anode and a composite cathode on the arc end of a continuously fed consumable electrode composed predominately of iron, said composite cathode comprising a molten body of said iron having an element selected from the group consisting of rubidium and cesium retained as an essential active cathodic constituent thereof.

20. An inert gas shielded straight polarity metal arc welding process in which a welding arc of the spray transfer type is maintained in an inert gaseous atmosphere between a workpiece as an anode and a composite cathode on the arc end of a continuously fed consumable electrode composed predominately of aluminum, said composite cathode comprising a molten body of said aluminum having an element selected from the group consisting of cesium and rubidium retained as an essential active cathodic constituent thereof.

References Cited in the file of this patent

UNITED STATES PATENTS

| Number | Name | Date |
| --- | --- | --- |
| 1,294,250 | Elliott | Feb. 11, 1919 |
| 1,501,266 | Brace (I) | July 15, 1924 |
| 1,977,278 | Judy | Oct. 16, 1934 |
| 2,053,417 | Brace (II) | Sept. 8, 1936 |
| 2,473,601 | Lobosco | June 21, 1949 |
| 2,504,868 | Muller | Apr. 18, 1950 |
| 2,515,559 | Lancaster | July 18, 1950 |
| 2,540,811 | Cobine | Feb. 6, 1951 |
| 2,544,711 | Mikhalapov | Mar. 13, 1951 |

FOREIGN PATENTS

| Number | Country | Date |
| --- | --- | --- |
| 495,299 | Great Britain | Nov. 10, 1938 |
| 546,961 | Great Britain | Aug. 7, 1942 |